(No Model.) 2 Sheets—Sheet 1.
B. C. SMITH.
PIPE CONNECTION FOR WASH TUBS.
No. 425,553. Patented Apr. 15, 1890.
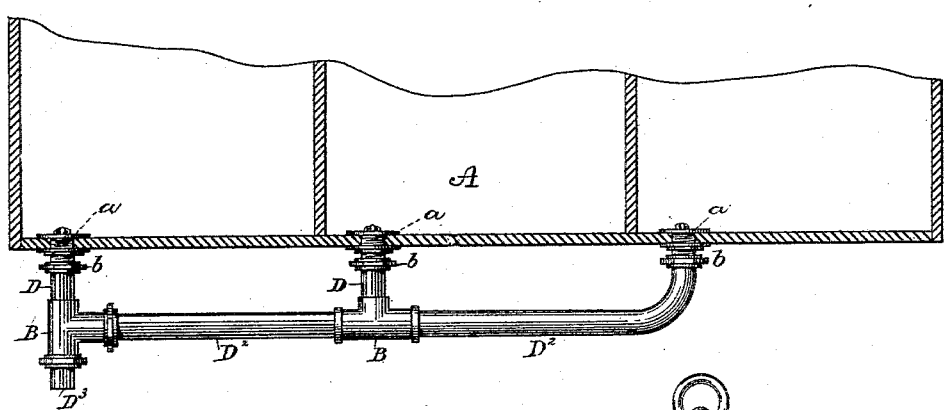
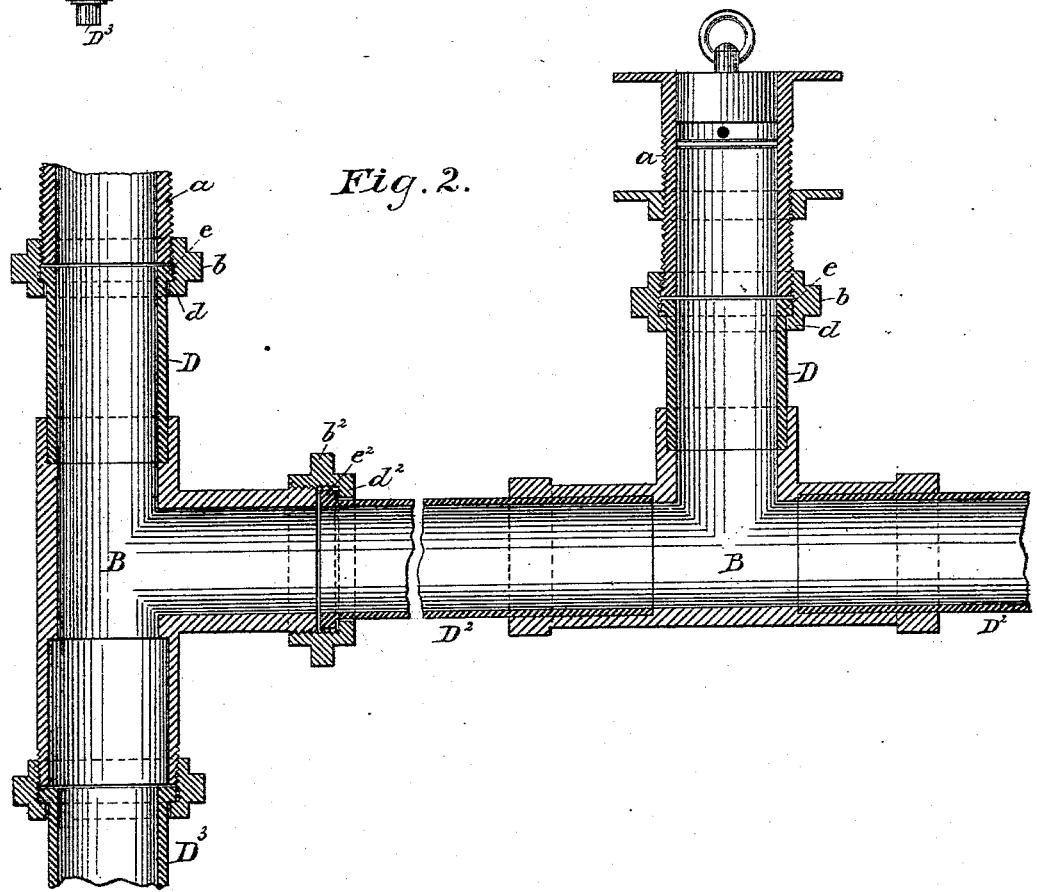
WITNESSES:
John M. Speer.
T. F. Bourne.
INVENTOR
Benjamin C. Smith
BY Briesen & Steele
ATTORNEYS (No Model.) 2 Sheets—Sheet 2.
B. C. SMITH.
PIPE CONNECTION FOR WASH TUBS.

No. 425,553. Patented Apr. 15, 1890.

WITNESSES:
John M. Speer.
T. F. Bourne.

INVENTOR
Benjamin C. Smith
BY Briesen & Steele
ATTORNEYS

UNITED STATES PATENT OFFICE.

BENJAMIN C. SMITH, OF BROOKLYN, ASSIGNOR TO FRED ADEE & CO., OF NEW YORK, N. Y.

PIPE-CONNECTION FOR WASH-TUBS.

SPECIFICATION forming part of Letters Patent No. 425,553, dated April 15, 1890.

Application filed May 4, 1888. Serial No. 272,753. (No model.)

*To all whom it may concern:*

Be it known that I, BENJAMIN C. SMITH, a resident of the city of Brooklyn, Kings county, New York, have invented Improvements in Pipe-Connections for Wash-Tubs, of which the following is a specification.

The object of my invention is to provide a series of expansible and contractible pipes and connections for wash-tubs, whereby wash-tubs of varying dimensions may be readily connected to the soil-pipes.

The invention consists in the details of improvement and the combinations of parts, that will be more fully hereinafter set forth.

Reference is to be had to the accompanying drawings, forming part of this specification, in which—

Figure 3:
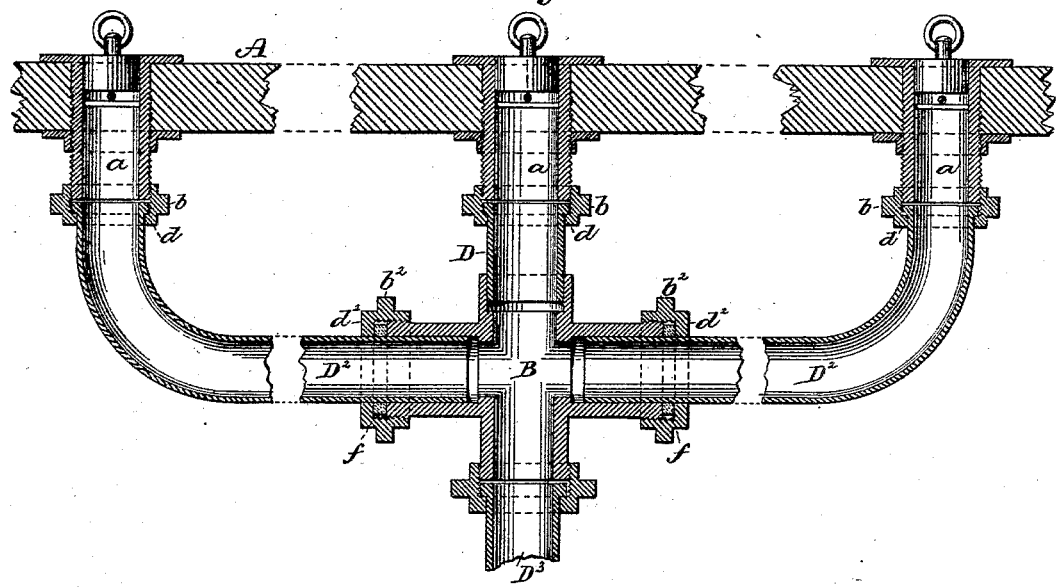
Figure 4:
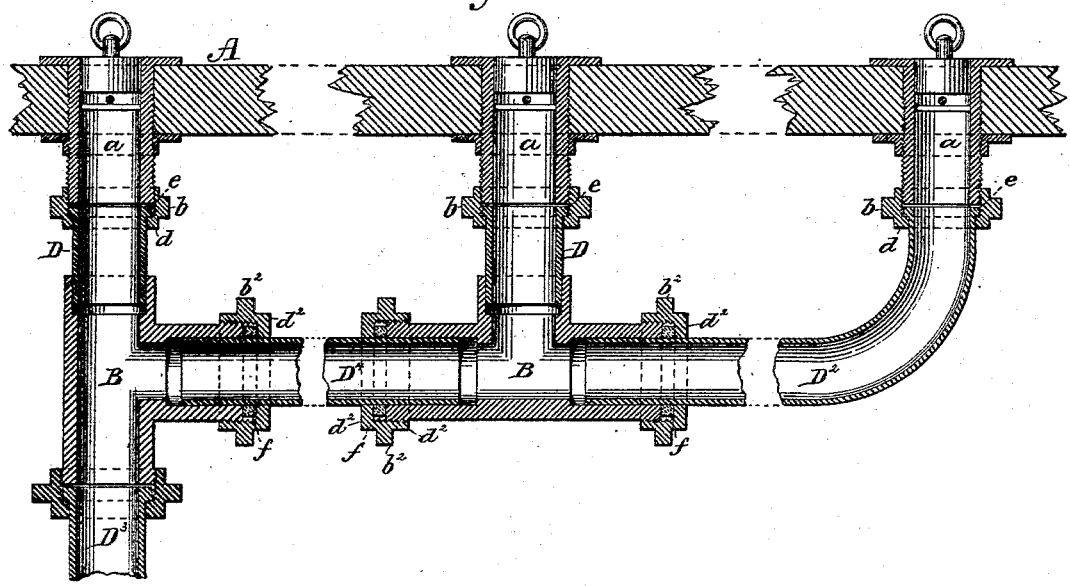

Figure 1 is a vertical longitudinal sectional view of a series of wash-tubs provided with my improved pipe-connections. Fig. 2 is an enlarged central sectional view through the pipes and connections, showing the details of construction; and Figs. 3 and 4 are modified forms of connections.

The letter A represents a series of stationary wash-tubs or wash-basins, of which there may be two or more, three being shown in the drawings.

$a$ $a$ are the tubular outlet-plugs, that pass through the bottoms of the tubs or basins and are suitably held thereto. The tubular plugs $a$ are screw-threaded externally beneath the tubs and receive nuts $b$, which nuts each have an internal annular flange $d$ at one end.

B are T or other shaped couplings, which at one part receive the smooth or unflanged ends of intermediate vertical pipes D, that are adapted to slide within the couplings B. The opposite end of each vertical pipe D has an external flange $e$. The flanged end of the vertical pipe D is held in the nut $b$ and the nut $b$ drawn upon the plug $a$, the flange $d$ on the nut pressing the flange $e$ against the end of the plug $a$, thereby making a tight connection. The unflanged end of the vertical pipe D may now be soldered to the coupling B, if desired to make a close connection. Thus the plugs $a$ are adjustably connected with the couplings B by the intervening vertical pipes D, there being one coupling to each tub; but the intermediate vertical pipes D could be dispensed with and the couplings be secured directly to the plugs $a$ by the nuts $b$.

One or more of the horizontal branches of the coupling B have external threads to receive the nuts $b^2$, that have inwardly-projecting flanges $d^2$. As in Fig. 1, every two couplings B are connected by a horizontal pipe $D^2$ of suitable length, which is flanged at one end and unflanged at the other. The flanged end of each pipe $D^2$ is held by the flange $d^2$ of the nut $b^2$ and drawn up close to the coupling by the nut. The other or unflanged end of the pipe $D^2$ is now inserted in its proper coupling B for the required distance and may be secured by solder, if desired. Thus it is seen that one coupling has the pipe $D^2$ drawn close up by the nut $b^2$, while the next coupling receives the unflanged end of the pipe.

Instead of securing the unflanged ends of the pipes $D^2$ to the couplings B, they may be slipped loosely into the couplings and held in position, and leaking prevented at the junctions by the nuts $b^2$, the flanges $d^2$ of which compress packing or washers $f$ around the pipes D and between said coupling and the flanges $d^2$, as in Fig. 3.

There may be any number of plugs $a$ and pipes and couplings connected thereto. One of the couplings B connects by a pipe $D^3$ with the soil-pipe or other outlet-pipe; but any of the couplings B could carry the pipe $D^3$. As shown in Figs. 1 and 4, one of the pipes $D^2$ is connected by the nut $b$ and flanges $d$ and $e$ directly with the plug $a$, while its unflanged end passes freely into the coupling B.

As shown in Fig. 3, the coupling B is a four-way coupling, and two pipes $D^2$ connect said coupling with the end plugs $a$, while said coupling is connected by the pipe D with the central plug $a$. The pipe $D^3$ leads from one branch of the four-way coupling; but the parts may be variously arranged and one or more intermediate pipes $D^4$, not having flanges $e$, as in Fig. 4, could be inserted in the system where a greater length of piping is required. As shown, the packing will be held by the nuts $b^2$, as before described, to prevent leakage.

With the above construction the plugs $a$ may be of varying distances apart and be readily connected by the pipes D D² and couplings B by passing the unflanged end of a pipe farther in or out of a coupling until the required position is found. The parts are then suitably fastened. With this arrangement a system of piping for wash-tubs may be sold that will fit any tubs, and an ordinary workman can readily set up the piping. This is a great saving on the practice heretofore employed of measuring and cutting each pipe and then soldering the pipes together. This system also overcomes the danger of becoming loosened and water escaping.

Having now described my invention, what I claim is—

The wash-trays A, having plugs $a$ in the bottoms of each at certain distances apart, and coupling-nuts $b$, carried by said plugs, combined with the pipes D and couplings B, one coupling B communicating with two plugs, each pipe being flanged at one end and unflanged at the other end, the unflanged ends passing freely within its corresponding coupling, so as to have longitudinal movement therein, whereby plugs $a$ that are at distances apart may be coupled to a single outlet, substantially as herein shown and described, and for the purpose set forth.

BENJAMIN C. SMITH.

Witnesses:
JOHN N. SANGER,
HARRY M. TURK.